United States Patent [19]

Michaels

[11] Patent Number: 6,112,908
[45] Date of Patent: Sep. 5, 2000

[54] MEMBRANE LAMINATES AND METHODS FOR THEIR PREPARATION

[75] Inventor: Alan Sherman Michaels, Chestnut Hill, Mass.

[73] Assignee: Rentiers Machinery Pty, Ltd., Australia

[21] Appl. No.: 09/022,016

[22] Filed: Feb. 11, 1998

[51] Int. Cl.[7] .............................. B05D 3/04; B05D 7/24; B05D 3/00; B01D 39/00; B01D 41/00

[52] U.S. Cl. .............. 210/506; 210/500.23; 210/500.27; 210/500.41; 210/500.42; 427/245; 427/140; 427/352; 427/378; 427/379; 428/421; 428/509; 428/510

[58] Field of Search .................................... 427/244, 245, 427/246, 296, 140, 352, 378, 379; 428/421, 507, 508, 509, 510, 704; 210/460, 500.21, 500.23, 500.24, 500.27, 500.41, 500.42, 506; 202/267.1

[56] References Cited

U.S. PATENT DOCUMENTS

| | | |
|---|---|---|
| 1,765,667 | 6/1930 | Gusmer . |
| 2,611,490 | 9/1952 | Robinson ................................. 210/130 |
| 3,186,917 | 6/1965 | Gerhardt et al. ............................ 195/1 |
| 3,291,613 | 12/1966 | Raible ......................................... 99/33 |
| 3,335,545 | 8/1967 | Robb et al. .................................. 55/16 |
| 3,425,839 | 2/1969 | Pinnegar ..................................... 99/31 |
| 3,502,651 | 3/1970 | Oldenburg ............................... 260/234 |
| 3,552,574 | 1/1971 | Lowe et al. ............................. 210/353 |
| 3,721,621 | 3/1973 | Hough et al. .............................. 210/22 |
| 3,787,240 | 1/1974 | Gillman et al. ........................... 136/30 |
| 3,847,163 | 11/1974 | Molyneux ................................ 131/143 |
| 3,865,960 | 2/1975 | Wucherpfennig et al. ............. 426/239 |
| 3,865,961 | 2/1975 | Wucherpfennig et al. ............. 426/239 |
| 3,915,820 | 10/1975 | Ito et al. ................................... 204/149 |
| 3,956,112 | 5/1976 | Lee et al. ............................... 210/22 C |
| 4,015,020 | 3/1977 | Nagasawa et al. ...................... 426/239 |
| 4,083,904 | 4/1978 | Sano et al. ................................ 264/41 |
| 4,113,912 | 9/1978 | Okita ........................................ 428/290 |
| 4,187,390 | 2/1980 | Gore ..................................... 174/102 R |
| 4,214,020 | 7/1980 | Ward et al. .............................. 427/296 |
| 4,218,312 | 8/1980 | Perry ..................................... 210/22 C |
| 4,230,463 | 10/1980 | Henis et al. ............................. 427/245 |
| 4,265,713 | 5/1981 | Cheng ....................................... 203/10 |
| 4,268,279 | 5/1981 | Shindo et al. .............................. 55/16 |
| 4,316,772 | 2/1982 | Cheng et al. ............................ 202/163 |
| 4,401,678 | 8/1983 | Beaumont ................................. 426/15 |
| 4,419,187 | 12/1983 | Cheng et al. ............................ 202/200 |
| 4,419,242 | 12/1983 | Cheng et al. ......................... 210/500.2 |
| 4,499,117 | 2/1985 | Bonneau ................................. 426/592 |
| 4,532,140 | 7/1985 | Bonnome ................................. 426/13 |
| 4,539,117 | 9/1985 | Meyer et al. ........................... 210/639 |
| 4,581,236 | 4/1986 | Bandel et al. ............................. 426/14 |
| 4,610,791 | 9/1986 | Henne et al. ............................ 210/490 |
| 4,610,887 | 9/1986 | Galzy et al. ............................. 426/490 |
| 4,612,196 | 9/1986 | Goldstein et al. ......................... 426/14 |
| 4,617,127 | 10/1986 | Light ....................................... 210/651 |
| 4,655,927 | 4/1987 | Ford ........................................ 210/639 |
| 4,664,918 | 5/1987 | Tilgner et al. ............................. 426/14 |
| 4,670,151 | 6/1987 | Bitter ....................................... 210/641 |
| 4,705,809 | 11/1987 | Dighton et al. ........................... 521/62 |
| 4,728,431 | 3/1988 | Nagura et al. ........................... 210/640 |
| 4,743,378 | 5/1988 | Ford ........................................ 210/640 |
| 4,778,688 | 10/1988 | Matson ................................... 426/425 |
| 4,787,837 | 11/1988 | Lefebvre ................................. 210/640 |
| 4,794,002 | 12/1998 | Henis et al. ............................. 424/488 |
| 4,816,407 | 3/1989 | Matson ................................... 435/287 |
| 4,906,169 | 3/1990 | Chien et al. ............................ 424/448 |
| 4,921,612 | 5/1990 | Sirkar ..................................... 210/644 |
| 4,933,198 | 6/1990 | Lee et al. ................................ 426/319 |
| 4,938,778 | 7/1990 | Ohyabu et al. ......................... 427/245 |
| 4,952,751 | 8/1990 | Blume et al. ........................... 585/818 |
| 4,960,520 | 10/1990 | Semmens ................................ 210/640 |
| 4,963,381 | 10/1990 | Girard et al. ........................... 426/490 |
| 4,983,303 | 1/1991 | Uragami ................................. 210/640 |
| 4,988,525 | 1/1991 | Gresch ................................... 426/493 |
| 5,013,447 | 5/1991 | Lee et al. ................................ 210/640 |
| 5,037,554 | 8/1991 | Nomi ...................................... 210/640 |
| 5,039,421 | 8/1991 | Linder et al. ........................... 210/651 |
| 5,066,403 | 11/1991 | Dutta et al. ............................. 210/638 |
| 5,076,932 | 12/1991 | Taylor .................................... 210/640 |
| 5,091,086 | 2/1992 | Stengaard .............................. 210/490 |
| 5,098,566 | 3/1992 | Lefebvre ................................. 210/640 |
| 5,102,550 | 4/1992 | Pizzino et al. ......................... 210/640 |
| 5,104,729 | 4/1992 | Stedronsky .......................... 428/304.4 |
| 5,130,024 | 7/1992 | Fugimoto et al. ................. 210/500.36 |

(List continued on next page.)

FOREIGN PATENT DOCUMENTS

| | | |
|---|---|---|
| 33543/68 | 8/1972 | Australia . |
| 0 394 193 | 10/1990 | European Pat. Off. . |
| 0 401 486 | 12/1990 | European Pat. Off. . |
| 0 456 939 | 11/1991 | European Pat. Off. . |
| 2944499 | 5/1981 | Germany . |
| 53-24568 | 9/1979 | Japan . |
| 58-78578 | 5/1983 | Japan . |
| 64-23882 | 1/1989 | Japan . |
| 3-30663 | 2/1991 | Japan . |
| 3-89922 | 4/1991 | Japan . |
| 1079517 | 8/1967 | United Kingdom . |
| 1177126 | 1/1970 | United Kingdom . |
| 1447505 | 8/1976 | United Kingdom . |
| 2054644 | 2/1981 | United Kingdom . |
| WO 85/00532 | 2/1985 | WIPO . |
| WO 87/02380 | 4/1987 | WIPO . |
| WO 87/06850 | 11/1987 | WIPO . |
| WO 88/05768 | 8/1988 | WIPO . |
| WO 92/04109 | 3/1992 | WIPO . |
| WO 93/0825 | 4/1993 | WIPO . |

OTHER PUBLICATIONS

Braatz, J.A., "Biocompatible Polyurethane–Based Hydrogel", *J. Biomaterials Applications*, 1994, 9, 71–96.

The Merck Index, 11th Ed., 1989, No. 7647.

Michaels, A.S. et al., "Membrane Permeation: Theory and Practice",*Progress in Separation and Purification*, Perry, E.S., Ed., 1968, vol. 1, John Wiley & Sons, Inc., New York, 143–186.

*Primary Examiner*—Diana Dudash
*Attorney, Agent, or Firm*—Woodcock Washburn Kurtz Mackiewicz & Norris LLP

[57] ABSTRACT

This invention presents novel membrane laminate structures useful for osmotic distillation, and methods for their preparation.

55 Claims, No Drawings

U.S. PATENT DOCUMENTS

| | | | |
|---|---|---|---|
| 5,143,526 | 9/1992 | Lee et al. | 55/158 |
| 5,160,353 | 11/1992 | Gochanour | 55/158 |
| 5,258,202 | 11/1993 | Pellegrino et al. | 427/235 |
| 5,258,203 | 11/1993 | Arthur | 427/245 |
| 5,274,047 | 12/1993 | Koenhen et al. | 427/245 |
| 5,281,430 | 1/1994 | Herron et al. | 426/490 |
| 5,324,538 | 6/1994 | Takashi et al. | 427/245 |
| 5,328,455 | 7/1994 | Lloyd et al. | 604/20 |
| 5,344,560 | 9/1994 | Sugo et al. | 427/245 |
| 5,368,889 | 11/1994 | Johnson et al. | 427/245 |
| 5,382,364 | 1/1995 | Bowser et al. | 210/640 |
| 5,382,365 | 1/1995 | Deblay | 210/644 |
| 5,428,123 | 6/1995 | Ward et al. | 128/28 |
| 5,510,125 | 4/1996 | Gresch | 426/11 |
| 5,523,118 | 6/1996 | Williams | 427/2.31 |
| 5,547,575 | 8/1996 | Demmer et al. | 427/245 |
| 5,580,650 | 12/1996 | Forgach et al. | 427/407.1 |
| 5,716,660 | 2/1998 | Weadock et al. | 427/2.25 |

MEMBRANE LAMINATES AND METHODS FOR THEIR PREPARATION

FIELD OF THE INVENTION

This invention is directed to novel laminate membrane structures and methods for their preparation. The laminate membranes are useful in, for example, osmotic distillation methods.

BACKGROUND OF THE INVENTION

Osmotic distillation is a technique for concentrating a liquid by placing the liquid to be concentrated and a second liquid of higher osmotic pressure on opposite sides of a microporous hydrophobic membrane. The differences in osmotic pressure result in solvent flow from the liquid of relatively low osmotic pressure to the liquid of higher osmotic pressure. See U.S. Pat. No. 4,781,837 to Lefebvre.

The successful practice of osmotic distillation for the concentration of liquid foodstuffs, beverages, and aqueous solutions of bioactive substances requires the interposition between such a liquid and a concentrated aqueous salt solution of a microporous, hydrophobic membrane which prevents entry of either liquid phase into the pores of the membrane (and consequent mixing of the two phases), while permitting unimpeded transfer of water vapor and other volatile components from one liquid phase to the other. This same process is also useful for the selective removal from an aqueous feed stream of a volatile solute, such as the dealcoholization of an alcoholic beverage such as wine or beer.

Many liquids whose concentration or other treatment by this means is desired contain nonvolatile surface active solutes which may concentrate and precipitate, or adsorb upon, the surface of such a membrane, rendering its surface, and the surfaces of the pores within it, hydrophilic and water-wettable. In that event, liquid penetration into and through the membrane pores will ensue, with consequent unacceptable contamination or loss of the product. A means for preventing this wet-out and penetration of the membrane upon contact with such feed streams is thus essential.

This limitation can be avoided by interposing, between the feed stream and the microporous, hydrophobic membrane, an extremely thin layer of a nonporous hydrogel of relatively high water content. Ideally, such a layer is freely permeable to water and other solutes (both volatile and non-volatile) which are present in the feed stream, but at the low pressures employed in osmotic distillation, will not pass liquid water, or any non-volatile solutes contained therein. At the interface between the hydrogel layer and the underlying microporous membrane, the only components present in the feed stream which can freely enter and penetrate the membrane pores are the vapors of water and other volatile solutes. All non-volatile solutes are constrained to the hydrogel, and must return by diffusion into the contacting feed liquid. It is thus impossible for the underlying microporous membrane to be contacted with a liquid phase containing surface active components, which can wet-out and penetrate the membrane pores.

The use of such hydrogel layers has been reported outside the context of osmotic distillation. See U.S. Pat. No. 4,419,187 and U.S. Pat. No. 4,419,242, both to Cheng et al.

Such a hydrogel layer must, of course, completely cover the exposed feed-side surface of the membrane, and be completely free of liquid-penetrable defects. On the other hand, this layer should be as thin as practicable, in order to minimize its resistance to transport of all volatile components. In addition, this layer must be strongly adherent to the underlying membrane so that it will resist detachment and/or damage by the fluid moving over it. Moreover, the layer should be of sufficient chemical and thermal stability to avoid its deterioration in extended contact with feed solutions of varying composition, as well as in contact with conventional cleaning and sterilizing media and conditions required in food and pharmaceutical processing. Finally, the layer must be capable of facile formation and placement on the underlying membrane by means which are adaptable to economic large scale membrane fabrication and lamination techniques.

Most hydrogels are formed from water-soluble polymers which are dissolved in water in relatively high concentration (of the order of 10% by weight or more), and then subjected to secondary crosslinkage while in solution by, for example, chemical reaction with crosslinking reagents, or by thermal conversion. Such materials and methods are hardly ideal for rapidly producing very thin layers on membranes at reasonable cost, for several reasons.

First, aqueous solutions of such polymers are usually of very high viscosity, so that their deployment as very thin films on either sheet- or hollow-fiber microporous membranes is exceedingly difficult. While use of more dilute, less viscous solutions would circumvent this problem, it would also be necessary to concentrate the solution so applied by an intermediate drying step, prior to treatment to insolubilize the polymer.

Further, such solutions have relatively high surface tensions, and do not spread on and wet hydrophobic surfaces. Consequently, it is virtually impossible to deposit thin, uniform, defect-free coatings of such polymers on these surfaces. While addition of a wetting agent to the solution might aid deposition of such a uniform thin film, it would have the disadvantage of also promoting "wicking" of the solution into the pores of the underlying membrane, thereby greatly impairing the function of the membrane laminate.

Moreover, such crosslinked hydrogel films normally exhibit poor adhesion to hydrophobic substrates. The use of corona-discharge, plasma-treatment, or surface-oxidation of the substrate membrane prior to coating can sometimes be used to ameliorate this problem. However, this is not only a costly additional operation, but often seriously weakens and deteriorates the membrane.

There is a need for materials and methods for producing such laminates which circumvent the foregoing limitations, and which afford the production of laminates (and of membrane modules containing such laminates) in a convenient and economic manner. This invention is directed to this important end.

SUMMARY OF THE INVENTION

The present invention is directed to novel materials and methods useful for the preparation of laminate membrane structures for use in osmotic concentration techniques such as, for example, osmotic distillation.

In some preferred embodiments, the methods for producing a laminate are provided, the laminate comprising a hydrogel layer bonded to a microporous hydrophobic membrane, comprising:

(a) dissolving or dispersing one or more hydrophilic prepolymers in a volatile, low surface tension organic liquid, or in an aqueous mixture of a volatile, low surface tension organic liquid, to produce a coating solution of the prepolymer;

(b) applying the coating solution to one surface of a microporous hydrophobic membrane sheet, or to the external surface of a microporous, hydrophobic hollow fiber membrane;

(c) rapidly evaporating the volatile components from the coating;

(d) crosslinking the prepolymer by contacting the coated surface with a solution of a crosslinking agent capable of rendering the coating water-insoluble;

(e) optionally water-washing the crosslinked polymer to remove water soluble components therefrom; and (f) drying the coating to remove residual moisture, thereby to produce the desired laminate.

In some preferred embodiments, the methods further comprise repeating steps (a)–(e).

In further preferred embodiments of the methods of the invention, the prepolymer has a molecular weight sufficiently high to prevent entry of the prepolymer into the pores of the microporous membrane, or is dispersed in aggregates that are larger than the pores of the membrane.

In still further preferred embodiments, the prepolymer in the first step (b) has a molecular weight sufficiently high to prevent entry of the prepolymer into the pores of the microporous membrane or is dispersed in aggregates that are larger than the pores of the membrane.

In some preferred embodiments, the prepolymer is a cellulose ether or ester, polyvinyl alcohol, polyvinyl alcohol copolymer with vinyl acetate, N-alkyl polyacrylamide, N-alkyl polyacrylamide copolymer with acrylamide, a polyethylene-glycol-based, isocyanate-capped polyurethane, an esterified or etherated polysaccharide, a hydroxyalkylated polyacrylate, a polymethacrylate, or a hydroxyalkylated polymethacrylate.

In more preferred embodiments, the prepolymer is a linear or branched polyethylene-glycol-based isocyanate-capped urethane, methylcellulose, hydroxyproplycellulose, hydroxypropylmethyl cellulose, polyvinyl alcohol, or a copolymer of vinyl acetate and vinyl alcohol.

In some preferred embodiments, the volatile low surface tension organic liquid is a water-soluble lower aliphatic alcohol, a water-soluble lower aliphatic ketone, a water-soluble lower aliphatic ether, acetonitrile, N-methyl pyrrolidinone, methyl cellosolve, mixtures thereof, or aqueous solutions thereof.

In more preferred embodiments, the volatile low surface tension organic solvent is methyl alcohol, ethyl alcohol, n-propyl alcohol, isopropyl alcohol, acetone, methyl ethyl ketone, tetrahydrofuran, dioxane, dimethylformamide, N-methyl pyrrolidinone, mixtures thereof, or aqueous solutions thereof, with acetone, isopropyl alcohol, or an aqueous mixture thereof being especially preferred.

Preferably, the microporous membrane is a PVDF, polytetrafluoroethylene, polysulfone, polyethylene, or polypropylene membrane.

Also provided in accordance with the present invention are methods comprising the steps of:

(a) dissolving or dispersing one or more hydrophilic prepolymers in a volatile, low surface tension organic liquid, or in an aqueous mixture of a volatile, low surface tension organic liquid, to produce a coating solution of the prepolymer;

(b) filling the feed-side flow path of a microporous hydrophobic, sheet membrane or hollow fiber membrane module with the coating solution;

(c) flowing warm, dry air or other inert gas through the strip-side of the membrane module to evaporate volatile components while continuing to feed coating solution to the feed-side flow path of the module for a time period sufficient to coat the membrane with the desired thickness of polymer;

(d) displacing the majority of the coating solution from the feed-side flow path;

(e) evaporating remaining solvent from the coated membrane laminate by flowing a gas through both the feed and strip channels of the module;

(f) optionally crosslinking the polymer by contacting the coated surface of the membrane with a solution of a crosslinking agent capable of crosslinking the polymeric coating and rendering it water-insoluble; and (g) drying the coating to remove residual moisture.

Some preferred embodiments further comprise repeating steps (a)–(f). In further preferred embodiments, the prepolymer has a molecular weight sufficiently high to prevent entry of the prepolymer into the pores of the microporous membrane, or is dispersed in aggregates that are larger than the pores of the membrane.

In still further preferred embodiments, the prepolymer in the first step (b) has a molecular weight sufficiently high to prevent entry of the prepolymer into the pores of the microporous membrane, or is dispersed in aggregates that are larger than the pores of the membrane.

In some preferred embodiments, the prepolymer is a cellulose ether or ester, polyvinyl alcohol, polyvinyl alcohol copolymer with vinyl acetate, N-alkyl polyacrylamide, N-alkyl polyacrylamide copolymer with acrylamide, an isocyanate-capped, polyethylene-glycol-based polyurethane, an esterified or etherated polysaccharide, a hydroxyalkylated polyacrylate, a polymethacrylate, or a hydroxylated polymethacrylate.

In further preferred embodiments, the prepolymer is a linear isocyanate-capped, polyethylene-glycol-based polyurethane, cellulose, methylcellulose, hydroxypropylcellulose, hydroxypropylmethyl cellulose, or copolymers of vinyl acetate and vinyl alcohol.

In some preferred embodiments, the volatile low surface tension organic liquid is a water-soluble lower aliphatic alcohol, a water-soluble lower aliphatic ketone, a water-soluble lower aliphatic ether, acetonitrile, N-methyl pyrrolidinone, methyl cellosolve, mixtures thereof, or aqueous solutions thereof.

In more preferred embodiments, the volatile low surface tension organic solvent is methyl alcohol, ethyl alcohol, n-propyl alcohol, isopropyl alcohol, acetone, methyl ethyl ketone, tetrahydrofuran, dioxane, dimethylformamide, N-methyl pyrrolidinone, mixtures thereof, or aqueous solutions thereof, with acetone, isopropyl alcohol, or an aqueous mixture thereof being especially preferred.

Preferably, the microporous membrane is a PVDF, polytetrafluoroethylene, polysulfone, polyethylene, or polypropylene membrane.

Also provided in accordance with the present invention are methods for producing a laminate, the laminate comprising a hydrogel layer bound to a microporous hydrophobic membrane, comprising:

(a) dissolving one or more cellulose polymers selected from methyl cellulose, hydroxypropyl cellulose and hydroxypropylmethyl cellulose in a volatile, low surface tension organic liquid, or an aqueous mixture of a volatile, low surface tension organic liquid, to produce a coating solution, the cellulose polymer having high methoxyl content, and/or high ratios of methyl to hydroxypropyl substitution;

(b) applying the coating solution to one surface of a sheet or hollow fiber microporous hydrophobic membrane;

(c) rapidly evaporating volatile components from the coating;

(d) optionally washing the membrane; and (e) drying the polymer to remove residual moisture to produce the laminate.

In some preferred embodiments, the methylhydroxypropyl- or hydroxypropylmethyl celluloses have a molecular weight sufficiently high to prevent entry of the prepolymer into the pores of the microporous membrane.

In some particularly preferred embodiments, the prepolymer is a hydroxypropylmethyl cellulose.

Also provided in accordance with the present invention are methods comprising the steps of:

(a) dissolving or dispersing one or more hydrophilic prepolymers in a volatile, low surface tension organic liquid, or in an aqueous mixture of a volatile, low surface tension organic liquid, to produce a coating solution of the prepolymer;

(b) feeding the coating solution to the feed-side flow channel of a sheet- or hollow-fiber-microporous hydrophobic membrane module in sufficient quantity and at a sufficient rate to form a polymer coating on the membrane surface of the desired thickness, while simultaneously passing an inert gas to the strip-side of the module to evaporate volatile components;

(c) evaporating residual volatile components from the coated membrane by flowing a gas through both the feed and strip channels of the coated module;

(d) optionally crosslinking the prepolymer by contacting the coated surface of the membrane with a solution of a crosslinking agent capable of crosslinking the polymeric coating and rendering it water-insoluble; and (e) drying the coating to remove residual moisture.

Some preferred embodiments of the methods of the invention further comprise repeating steps (b)–(d).

In some preferred embodiments, the prepolymer has a molecular weight sufficiently high to prevent entry of the prepolymer into the pores of the microporous membrane, or is dispersed in aggregates that are larger than the pores of the membrane.

In further preferred embodiments, the prepolymer in the first step (b) has a molecular weight sufficiently high to prevent entry of the prepolymer into the pores of the microporous membrane, or is dispersed in aggregates that are larger than the pores of the membrane.

In some preferred embodiments, the prepolymer is a cellulose ether or ester, polyvinyl alcohol, polyvinyl alcohol copolymer with vinyl acetate, N-alkyl polyacrylamide, N-alkyl polyacrylamide copolymer with acrylamide, an isocyanate-capped, polyethylene-glycol-based polyurethane, an esterified or etherated polysaccharide, a hydroxyalkylated polyacrylate, a polymethacrylate, or a hydroxylated polymethacrylate.

In further preferred embodiments, the prepolymer is a linear isocyanate-capped, polyethylene-glycol-based polyurethane, cellulose, methylcellulose, hydroxypropylmethyl cellulose, or copolymers of vinyl acetate and vinyl alcohol.

In some preferred embodiments, the volatile low surface tension organic liquid is a water-soluble lower aliphatic alcohol, a water-soluble lower aliphatic ketone, a water-soluble lower aliphatic ether, acetonitrile, N-methyl pyrrolidinone, methyl cellosolve, mixtures thereof, or aqueous solutions thereof.

In more preferred embodiments, the volatile low surface tension organic solvent is methyl alcohol, ethyl alcohol, n-propyl alcohol, isopropyl alcohol, acetone, methyl ethyl ketone, tetrahydrofuran, dioxane, dimethylformamide, N-methyl pyrrolidinone, mixtures thereof, or aqueous solutions thereof, with acetone, isopropyl alcohol, or an aqueous mixture thereof being especially preferred.

Preferably, the microporous membrane is a PVDF, polytetrafluoroethylene, polysulfone, polyethylene, or polypropylene membrane.

Also provided by the present invention are novel methods for producing a laminate, the laminate comprising a hydrogel layer bound to a microporous hydrophobic membrane, comprising the steps of:

(a) dissolving or dispersing one or more hydrophilic prepolymers in a volatile, low surface tension organic liquid, or in an aqueous mixture of a volatile, low surface tension organic liquid, to produce a coating solution of the prepolymer;

(b) applying the coating solution to one surface of a sheet- or hollow fiber microporous hydrophobic membrane, or to the surface of a woven fabric containing microporous, hydrophobic hollow-fiber membranes;

(c) rapidly evaporating the volatile low surface tension organic liquid from the coating;

(d) optionally crosslinking the polymer by contacting the coated surface with a solution of a crosslinking agent capable of crosslinking the polymeric coating and rendering it water-insoluble; and (e) drying polymer to remove residual moisture.

Some preferred embodiments of the methods of the invention further comprise repeating steps (a)–(d).

In some preferred embodiments, the prepolymer has a molecular weight sufficiently high to prevent entry of the prepolymer into the pores of the microporous membrane, or is dispersed in aggregates that are larger than the pores of the membrane.

In further preferred embodiments, the prepolymer in the first step (b) has a molecular weight sufficiently high to prevent entry of the prepolymer into the pores of the microporous membrane, or is dispersed in aggregates that are larger than the pores of the membrane.

In some preferred embodiments, the prepolymer is a cellulose ether or ester, polyvinyl alcohol, polyvinyl alcohol copolymer with vinyl acetate, N-alkyl polyacrylamide, N-alkyl polyacrylamide copolymer with acrylamide, an isocyanate-capped, polyethylene-glycol-based polyurethane, an esterified or etherated polysaccharide, a hydroxyalkylated polyacrylate, a polymethacrylate, or a hydroxylated polymethacrylate.

In further preferred embodiments, the prepolymer is a linear isocyanate-capped, polyethylene-glycol-based polyurethane, cellulose, methylcellulose, hydroxypropylmethyl cellulose, or copolymers of vinyl acetate and vinyl alcohol.

In some preferred embodiments, the volatile low surface tension organic liquid is a water-soluble lower aliphatic alcohol, a water-soluble lower aliphatic ketone, a water-soluble lower aliphatic ether, acetonitrile, N-methyl pyrrolidinone, methyl cellosolve, mixtures thereof, or aqueous solutions thereof.

In more preferred embodiments, the volatile low surface tension organic solvent is methyl alcohol, ethyl alcohol, n-propyl alcohol, isopropyl alcohol, acetone, methyl ethyl ketone, tetrahydrofuran, dioxane, dimethylformamide, N-methyl pyrrolidinone, mixtures thereof, or aqueous solutions thereof, with acetone, isopropyl alcohol, or an aqueous mixture thereof being especially preferred.

Preferably, the microporous membrane is a PVDF, polytetrafluoroethylene, polysulfone, polyethylene, or polypropylene membrane.

In some particularly preferred embodiments of the foregoing methods, the sheet-microporous membrane or membrane laminate module is provided by cleaning a sheet-microporous membrane or a membrane laminate module which has a damaged hydrogel layer.

Also provided are membrane laminates produced by the methods of the invention.

DETAILED DESCRIPTION

The present invention provides novel materials and methods for producing membrane laminates suitable for use in the concentration or dealcoholization of liquid foodstuffs, beverages, ferments, and aqueous solutions of biological products. The laminates consist of one or more thin layers of non-porous, defect-free polymeric hydrogels bonded to the surface of a microporous, non-water-wettable (i.e. hydrophobic) membrane.

In some preferred embodiments, the methods for producing a laminate are provided, said laminate comprising a thin hydrogel layer firmly bonded to a microporous hydrophobic membrane, comprising:

(a) dissolving or dispersing one or more hydrophilic prepolymers in a volatile, low surface tension organic liquid, or in an aqueous mixture of a volatile, low surface tension organic liquid, to produce a coating solution of the prepolymer;

(b) applying the coating solution to one surface of a microporous hydrophobic membrane sheet, or to the external surface of a microporous, hydrophobic hollow fiber membrane;

(c) rapidly evaporating the volatile components from the coating;

(d) crosslinking the prepolymer by contacting the coated surface with a solution of a crosslinking agent capable of rendering the coating water-insoluble;

(e) optionally water-washing the crosslinked polymer to remove water soluble components therefrom; and (f) drying the coating to remove residual moisture, thereby producing the desired laminate.

The laminates of the present invention can be in sheet or hollow-fiber configuration. The methods of the present invention will permit fabrication of laminates by simpler and more economic procedures than those currently in use. In some preferred embodiments of the invention, methods are provided for the preparation of laminates by treatment of finished, pre-assembled membrane modules.

In further preferred embodiments, methods are provided for the in-situ recoating of deteriorated or damaged laminate modules, comprising the steps of:

(a) dissolving or dispersing one or more hydrophilic prepolymers in a volatile, low surface tension organic liquid, or in an aqueous mixture of a volatile, low surface tension organic liquid, to produce a coating solution of the prepolymer;

(b) feeding the coating solution to the feed-side flow channel of a sheet- or hollow-fiber-microporous hydrophobic membrane module in sufficient quantity and at a sufficient rate to form a polymer coating on the membrane surface of the desired thickness, while simultaneously passing an inert gas to the strip-side of the module to evaporate volatile components;

(c) evaporating residual volatile components from the coated membrane by flowing a gas through both the feed and strip channels of the coated module;

(d) optionally crosslinking the polymer by contacting the coated surface of the membrane with a solution of a crosslinking agent capable of crosslinking the polymeric coating and rendering it water-insoluble; and (e) drying the coating to remove residual moisture.

The methods of the invention can be used for producing a suitable thin-hydrogel-film/hydrophobic microporous membrane laminate for osmotic distillation applications in situ in assembled sheet-membrane and hollow-fiber membrane modules or contactors.

In a further aspect, the present invention presents novel methods for producing a laminate, the laminate comprising a hydrogel layer bound to a microporous hydrophobic membrane, comprising the steps of:

(a) dissolving or dispersing one or more hydrophilic prepolymers in a volatile, low surface tension organic liquid, or in an aqueous mixture of a volatile, low surface tension organic liquid, to produce a coating solution of the prepolymer;

(b) applying the coating solution to one surface of a sheet- or hollow fiber microporous hydrophobic membrane, or to the surface of a woven fabric containing microporous, hydrophobic hollow-fiber membranes;

(c) rapidly evaporating the volatile low surface tension organic liquid from the coating;

(d) optionally crosslinking the polymer by contacting the coated surface with a solution of a crosslinking agent capable of crosslinking the polymeric coating and rendering it water-insoluble; and (e) drying polymer to remove residual moisture.

As used herein, the term "inert gas" denotes any gas, or mixture of gases, that will not detrimentally react with components of the coating solution. Preferred inert gases include warm, dry air, and nitrogen.

The preferred hydrophobic, microporous membranes for use in this invention are those familiar to the skilled practitioner in the art of osmotic distillation. They include microporous high-density polyethylene membranes, microporous polypropylene membranes (for example, those manufactured by Hoechst Celanese Separation Products under the trade name of Celgard®, and by AKSO NV under the trade name of Accurel®), microporous polyvinylidene fluoride (PVDF) membranes (for example, those manufactured by Millipore Corporation), microporous polytetrafluorethylene membranes by W. L. Gore under the trade name of GoreTex®), and microporous polyester and polyether sulfone membranes.

In accordance with preferred embodiments of the invention, each of the foregoing hydrophobic, microporous membranes are non-water wettable, and all but the PTFE membranes are wettable by liquids of surface tension of ca. 35 dynes/cm or less.

The methods of the invention are useful for the preparation of membrane laminates from new membrane modules, as well as for the repair of membrane laminate modules which have undergone deterioration with age, or have otherwise suffered damage to the hydrogel layer of the laminate.

Most hydrophilic polymers used as hydrogel layers for membrane laminates are amenable to depolymerization and/or resolubilization by treatment with aqueous solutions of reagents (e.g., acids or bases) under conditions which will not adversely affect the underlying microporous membrane, or other module components. Thus, in accordance with preferred embodiments of the invention, such a solution is passed through the feed channel of a module, and the damaged or deteriorated hydrogel layer is solubilized and removed. After washing of the treated module with water to remove residual reagents and soluble impurities, and then drying the module with, for example, warm, dry air, the module is then in recoated according to the procedure described above.

In order to provide a membrane laminate with sufficient permeability to water and other water-soluble volatile solutes to be useful for osmotic distillation, it is greatly preferred that the hydrogel layer of the laminate be as thin as possible consistent with mechanical strength and freedom from liquid-permeable defects, and of adequately high water content to provide minimal obstruction to permeation by water and microsolutes. Thus, in preferred embodiments of the invention the hydrogels have water contents at use temperature in excess of about 40% by weight.

The mechanical strength and durability of a hydrogel decreases quite rapidly with increasing water content. Thus, in preferred embodiments, hydrogels of the invention contain from about 40% to about 90% water by weight, more preferably from about 50% to about 80% by weight. Hydrogels having greater than about 90% water by weight are less preferred, as they may be too fragile.

It will be recognized by those skilled in the membrane art that it is very difficult to produce, whether by coating or other techniques, reliably defect-free membranes of a thickness less than about 5 micrometers. Hence, in preferred embodiments hydrogel coatings on laminate membranes of the invention are preferably no less than 5 micrometers in their hydrated state. More preferably, the hydrogel layers should be deposited in a thickness of from about 10 to about 20 micrometers (in the hydrated state).

In accordance with the present invention, the thickness of the hydrogel layer of the final laminate can be controlled either by adjusting the concentration of polymer in the coating solution, or by adjusting the volume of solution applied to the substrate membrane, or by adjusting both.

In general, hydrophilic polymers suitable for producing hydrogel films of the desired properties for this purpose are water-soluble synthetic or natural polymers with good film-forming properties, and which are capable of covalent crosslinkage under mild conditions to render them water-insoluble, yet water absorptive. Such polymers are widely used in the papermaking, packaging, photographic film manufacturing, and textile finishing industries as paper coating binders, textile sizing and stiffening agents, grease-resistant coatings, adhesives, dyeing assistants, and the like. Further information on the properties, characteristics, methods of making and using, and manufacturers of such polymers can be found in "Industrial Gums, Polysaccharides and Their Derivatives, whistler, R. L. and BeMiller, J. N. Edes. Academic Press, San Diego, 1993, the disclosure of which is hereby incorporated by reference in its entirety.

Preferred polymers useful in the present invention include naturally occurring polysaccharides obtained from marine or terrestrial vegetable sources, such as agar, carrageenan, algin, starch, cellulose, guar, gum arabic, and the like, and/or chemically-modified derivatives thereof. Useful derivatives of such hydroxylated polymers, which render them more readily soluble in water or organic solvents, impart improved mechanical and film-forming properties, and/or facilitate crosslinkage, include alkyl and hydroxyalkyl ester, carboxyalkyl, alkyl ether, hydroxyalkyl ether, amino, aminoalkyl, and sulfoalkyl substitutions.

Further preferred polymers include synthetic, linear polymers such as polyacrylamide and its N-alkyl or N-hydroxyalkyl derivatives, polyacrylic and polymethacrylic acids and salts and esters thereof, polyvinyl alcohol and its copolymers with vinyl acetate, copolymers of maleic acid and vinyl methyl ether or vinyl acetate and salts and esters thereof, and polyoxyalkylene polymers such as polyethylene glycol and its copolymers with propylene glycol.

Particularly preferred polymers for use in the present invention are the alkyl and hydroxyalkyl ethers of cellulose, especially those containing both methyl and hydroxypropyl ether substitutions. These polymers are amphiphilic, displaying solubility in both water and water-miscible, volatile, polar organic solvents such as, for example, the lower aliphatic alcohols, lower aliphatic ketones, lower aliphatic ethers, methyl cellosolve, acetone, acetonitrile, tetrahydrofuran, dioxane, N-methyl pyrrolidinone, and mixtures thereof. Thus, solutions or colloidal dispersions of these polymers in solvents and solvent mixtures of sufficiently low interfacial tension to spread readily on the surface of hydrophobic, microporous membranes, can be produced. Significantly, these solvents and solvent mixtures are of low enough surface tensions to readily wet the surface of microporous polyolefin, PVDF, and polysulfone membranes in accordance with the methods of the invention.

Other suitable amphiphilic polymers include the hydroxyalkyl acrylates and methacrylates, vinyl alcohol/vinyl acetate copolymers, polyethylene glycol, and block copolymers of ethylene and propylene glycols.

Particularly preferred polymers for use in the present invention include polyethylene glycols and/or polyethylene glycol/polypropylene glycol block copolymers which have been coreacted with di- and tri-isocyanates in excess to produce linear or branched isocyanate-capped, urethane-linked polyglycols, such as, for example, those marketed under the trade name of Hypol® by Hampshire Chemical Company of Lexington, Mass. These prepolymers are viscous liquids which are freely soluble in water and polar organic solvents, and mixtures thereof. Upon dissolution to liquid water or exposure to water vapor, however, slow hydrolytic reaction with the terminal isocyanate groups occurs to yield first a carbamic acid, which decomposes into carbon dioxide and a primary amine. These terminal amino groups then react rapidly with the residual isocyanate termini to form a stable interchain urea linkage, thereby yielding a stable hydrogel. In accordance with the present invention, the water uptake of such gel is readily controlled by proper choice of the molecular weight of the starting polyglycol. See, for example the Hampshire product literature, and James A. Braatz, *Biocompatible Polyurethane-Based Hydrogel,*" J. Biomaterials Applications, 9, 71 (1994). In addition, in solution in aprotic organic solvents such as acetone, tetrahydrofuran, ethyl acetate, methylene chloride, and other aprotic solvents having adequately low surface tension to be useful in the present invention, the prepolymers are shelf-stable for long periods, provided they are kept out of contact with water or other protic compounds such as alcohols or acids.

Hence, in accordance with preferred methods of the invention, a microporous, hydrophobic membrane is coated with such a polymer applied from solution in a volatile, aprotic organic liquid; the organic liquid is rapidly removed by evaporation; and the coating is then exposed to steam or moist air to cause crosslinkage of the coating and its conversion into a stable hydrogel film. Thus, the present invention provides a considerably simpler methods for the production of the membrane laminates, by avoiding the necessity of a separate chemical treatment step to effect crosslinkage of the polymer.

In some preferred embodiments, the polymer solution is applied by standard coating techniques, preferably by dip-coating, roll-coating, or spraying.

In further preferred embodiments of the present invention, a multi step coating operation is performed in which one hydrophilic polymer is applied to the microporous membrane substrate as above described, and after drying, one or more additional layers of hydrophilic polymer are similarly applied and allowed to dry. The resulting double-layer coating is then optionally subjected to post-treatment by chemical or thermal means to crosslink the polymers.

In preferred embodiments, such a two-step process is employed if a polymer has a sufficiently high molecular weight to prevent its penetration into the substrate membrane pores, but yields a solution of such high specific viscosity that the coating solution suitable for application is too dilute to yield a coating of adequate thickness. In this event, the polymers selected for the second and any subsequent coating steps can, if desired, be of lower molecular weight than that required for the first layer, to allow the use of more concentrated solutions, and thus fewer coating steps to achieve the desired final coating thickness.

In accordance with the present invention, it has been discovered that where the soluble polymer employed for the coating is of adequately high molecular weight, a dilute solution or colloidal dispersion prepared by dissolving or dispersing the prepolymer in a volatile organic liquid or liquid mixture of low surface tension, when applied to the surface of the microporous membrane, will spread on and wet out the membrane surface to yield a uniform liquid film. However, the pores in the substrate membrane are too small to permit entry of the polymer molecules or particles in the solution, although the solvent will be imbibed by capillarity into the pores. As a result of this spontaneous imbibition and sieving effect, the polymer is constrained to remain on the membrane surface. If evaporation of solvent from either side (or both sides) of the coated membrane is allowed to take place, all the polymer present in the applied solution will be deposited as a uniform, adherent layer on the surface to which it was applied.

Thus, it is greatly preferred that the prepolymer in the coating solution, or the final crosslinked polymer, not penetrate into the pores of the substrate microporous membrane at any point in the methods of the invention. Such penetration would lead to defects in the membrane, and/or obstructions to vapor flow. Thus, in preferred embodiments of the invention, the prepolymer is of sufficiently high molecular weight that its hydrodynamic diameter in solution is sufficiently greater than the diameter of the pores in the substrate membrane for it to be excluded from the membrane pores, and be retained as a homogeneous, thin film on the membrane surface.

In some preferred embodiments of the invention this requirement can also be met by selecting as the solvent component of the coating solution a low-surface-tension organic liquid or liquid mixture in which the polymer is not in true molecular solution, but is present as a dispersion of submicroscopic particles whose dimensions exceed those of the pores of the substrate membrane. Subsequent coalescence of these particles during the drying process into a homogeneous, defect-free layer will yield the desired laminate of this invention.

As used herein, the term "low surface tension" means a liquid of surface tension at room temperature (i.e., about 20–25° C.) not higher than about 40 dynes/cm.

In accordance with some preferred embodiments of the invention, one or more prepolymers is first dissolved in a volatile, low surface tension organic liquid (i.e., a solvent) to produce a coating solution. The coating solution is then applied to a sheet or hollow fiber microporous hydrophobic membrane under conditions where the volatile components of the coating solution can be rapidly removed by evaporation.

In some preferred embodiments of the present invention laminates are produced with amphiphilic, reactive prepolymers which form stable hydrogels on exposure to water. Typically, a prepolymer solution is applied to a sheet or hollow fiber microporous hydrophobic membrane by conventional dip-coating, roll-coating, or spray-coating applications, under conditions where the volatile liquid can be rapidly removed by evaporation. Because this solution will wet out the membrane surface, a highly uniform and adherent coating will be produced. Under conditions of rapid solvent evaporation, however, the viscosity of the remaining prepolymer will be too high to permit wicking of the prepolymer into the pores of the substrate. Thus, in some preferred embodiments of the invention, the thickness of the final coating can be controlled by varying the prepolymer concentration in the prepolymer coating solution.

A wide variety of prepolymers can be used as the hydrophilic coating on a hydrophobic microporous membrane in accordance with the present invention. It is desirable that the prepolymer be intrinsically water-soluble and capable of covalent crosslinkage to yield a stable hydrogel. In preferred embodiments, the polymer is also soluble in polar, water-miscible, volatile organic liquids having low surface tension such as the lower aliphatic alcohols, lower aliphatic ketones, lower aliphatic ethers, acetonitrile, N-methyl pyrrolidinone, methyl cellosolve, acetone, tetrahydrofuran, dioxane, dimethylformamide, and ethylene glycol dimethyl ether (Cellosolve), or aqueous mixtures thereof. Preferably, the prepolymer is of sufficiently high molecular weight to be excluded from the pores of the substrate microporous membrane.

Preferred polymers for use in the present invention include the cellulose ethers and esters, polyvinyl alcohol and its copolymers with vinyl acetate, polyethylene oxide and its copolymers with polypropylene oxide, N-alkyl polyacrylamides and their copolymers with acrylamide, isocyanate capped polyethylene-glycol-based polyurethanes, starch esters, starch ethers, other esterified or etherated polysaccharides, and hydroxyalkylated polyacrylates and polymethacrylates.

Some preferred prepolymers especially useful in the present invention are linear or branched isocyanate capped polyethylene glycol (PEG) urethanes formed from intermediate molecular weight (e.g., from 200 to 10000 Daltons) PEGs by reaction in stoichiometric excess with diisocyanates. These PEG-urethane prepolymers are reacted with additional diisocyanate to yield isocyanate-terminated, linear PEG urethane prepolymers. These prepolymers are amphiphilic, soluble in both water and a variety of polar organic liquids, and react with water to form urea-crosslinked, stable hydrogels. They also possess the advantage of being highly reactive, yet shelf-stable viscous liquids possessing the solubility characteristics of the component polyethers.

In some preferred embodiments of the present invention, the prepolymer is a linear or branched polyethylene-glycol-based isocyanate capped polyurethane, cellulose, methylcellulose, hydroxyproplycellulose hydroxypropylmethyl cellulose, or copolymers of vinyl acetate and vinyl alcohol.

In some especially preferred embodiments of the present invention, hydroxypropylmethyl cellulose, a water-soluble film-forming cellulosic polymer, is employed as the prepolymer in the polymer solution. Hydroxypropylmethyl cellulose is produced commercially in a variety of methoxyl contents, and ratios of methyl to hydroxypropyl substitution. One particularly preferred hydroxypropylmethyl cellulose suitable for use in the present invention is Methocel© J75M-SN, which has a molecular weight of ca 200,000, and is commercially available from Dow Chemical Company, Midland, Mich.

Other particularly preferred prepolymers include hydroxypropylcelluloses having higher methoxyl content, and/or higher ratios of methyl to hydroxypropyl substitution than Methocel J75. These polymers are less soluble in water at ambient temperature than is Methocel J75, and can be applied from low surface tension organic liquid mixtures such as acetone/water solutions, deposited as uniform films by simple drying, and require no post treatment (i.e., no crosslinking step) to render them water-insoluble. Thus, in some preferred embodiments, the present invention provides methods for producing laminate membranes comprising the steps of:

(a) dissolving one or more cellulose polymers selected from methyl cellulose, hydroxypropyl cellulose and hydroxypropylmethyl cellulose in a volatile, low surface tension organic liquid, or an aqueous mixture of a volatile, low surface tension organic liquid, to produce a coating solution, the cellulose polymer having high methoxyl content, and/or high ratios of methyl to hydroxypropyl substitution;

(a) applying the coating solution to one surface of a sheet or hollow fiber microporous hydrophobic membrane;

(c) rapidly evaporating volatile components from the coating;

(d) optionally washing the membrane; and (e) drying the polymer to remove residual moisture to produce the laminate.

As used herein, the term "high methoxyl content, and/or high ratios of methyl to hydroxypropyl substitution" is intended indicate either a methoxyl content or ratio of methyl to hydroxypropyl substitution approximately as high as that of Methocel© J75M-SN; i.e., a methoxy content of about 1.3 substitutions per glucopyranose, and ratio of methyl to hydroxypropyl substitution of about 1.56.

The present invention also includes use of prepolymer solutions containing more than one type of prepolymer dissolved in the volatile, low surface tension organic liquid.

Thus, in some preferred embodiments of the invention, a hydrophobic microporous membrane is first coated with a prepolymer solution as described above. The coated membrane then is optionally crosslinked to produce a first hydrogel layer, and coated again with one or more successive prepolymer solutions. It will be appreciated that only the first prepolymer coating of the membrane need be of high molecular weight, or be in a low surface tension organic liquid, as successive prepolymers will contact the first hydrogel layer, and will not contact the hydrophobic membrane surface.

The prepolymer (or prepolymers) is dissolved in an organic liquid of high volatility and low surface tension (or aqueous solution thereof) to produce a prepolymer solution, which is then used to coat the microporous membrane. The prepolymer can be dissolved in the organic liquid or aqueous mixture thereof by any conventional method. The term "high volatility" is intended to mean a liquid whose normal boiling point is lower than or but slightly higher than that of water, and/or whose partial pressure over its aqueous solutions is greater than that of water.

Organic liquids (i.e., organic solvent components of the coating solution) for use in the polymer solution, besides functioning as good solvents or cosolvents for the polymers, preferably should be miscible with, or have high solubility in water. Thus, preferred organic liquids (or solvents) include the lower aliphatic alcohols (i.e., methyl, ethyl, or propyl), lower aliphatic ketones, lower aliphatic ethers, acetone, tetrahydrofuran, acetonitrile, N-methyl pyrrilidinone, methyl cellosolve, methylene chloride, and mixtures thereof. Other suitable organic solvents will be apparent to those of skill in the art, once armed with the present disclosure.

In preferred embodiments of the invention, the thickness of prepolymer coating typically ranges from about 0.5 microns to about 20 microns, more preferably from about 2 microns to about 10 microns. However, it will be appreciated by those of skill in the art that the optimum prepolymer thickness will vary for different prepolymer solutions and for different microporous membranes, especially where the hydrogel layer contains more than one individual coating of prepolymer solution.

The ability of a microporous membrane to retain a prepolymer in solution is dependent on the pore size of the membrane, and the molecular weight of the polymer. Substantially complete retention will be achieved if the pore size of the membrane is substantially smaller than the hydraulic diameter of the dissolved prepolymer. If this condition is satisfied, then the thickness of the resulting coating will be determined solely by the concentration of polymer in solution, and the quantity of solution contacting the membrane surface (per unit area) prior to solvent evaporation. Thus, in some preferred embodiments of the invention, prepolymers are soluble in volatile polar organic solvents, and/or in mixtures of these solvents with water, and have sufficiently high molecular weight (i.e., sufficiently large hydrodynamic diameters) to be retained on the surface of conventional microporous hydrophobic membranes. The thickness of the coating of such prepolymers is then controlled, in preferred embodiments, by varying the prepolymer concentration in the coating solution.

While there is, in principle, no upper limit to the polymer molecular weight which will meet these requirements, there is a practical limit imposed by the increase in solution viscosity which is a consequence of increasing polymer molecular weight. If the polymer solution is too viscous, deposition of the solution uniformly over the membrane surface, and controlling the thickness of the liquid film, becomes difficult to achieve. Although the viscosity of such a solution can be reduced by dilution with additional solvent, the resulting decrease in polymer concentration can result (after solvent evaporation) in the deposition of a layer of hydrogel on the laminate which is too thin.

Thus, in accordance with preferred embodiments of the invention, the coating solution should preferably have a viscosity of from about 100 to about 1000 centipoises, preferably 100 to about 500 centipoises, and more preferably from about 100 to about 200 centipoises.

For membrane laminates produced by a single coating of polymer solution, the coating solution preferably contains a polymer of molecular weight of from about ca. 200,000 to about one million Daltons, and preferably from about 200,000 to about 500,000 Daltons. In preferred embodiments, the coating solution contains the polymer at a concentration of from about 0.05% to about 10% by weight, more preferably from about 0.5% to about 5%, and more preferably from about 1.0% to about 2.0%, with a concentration of about 1.0% by weight being most preferred.

Coating solutions having polymer concentrations lower than about 0.05% will be acceptable where successive applications of coating solutions are desired, such as in the formation of laminates having multiple hydrogel layers. Preferably, a solvent evaporation step is employed between successive coatings.

In some preferred embodiment of the present invention, the polymer solution is prepared by adding prepolymer (e.g., Methocel© J75M-SN) in powder form to an organic solvent of low surface tension (for example isopropyl alcohol), to produce a suspension (the gum being insoluble in the alcohol), and then slowly adding a more polar solvent (e.g. water) to the suspension until the resulting viscous and nearly transparent solution appears to be a true solution of the polymer. It has been discovered in accordance with the present invention that the slow addition to this solution of an additional small amount of organic solvent will cause the viscosity of the solution to rapidly drop, and the solution to become somewhat opalescent. When used as the coating solution in the methods of the invention, this solution produces coatings which are equal to or superior to those obtained with the clear, viscous solution. Additionally, this less viscous solution is advantageous in that it is a easier to apply, and seems to dry more rapidly.

While not wishing to be bound by any specific theory, it is believed that in a mixture of a "good" and "poor" solvent for a polymer (like water and isopropyl alcohol, respectively) the polymer may not be in true solution if the concentration of the good solvent is too low. In such a solvent mixture, the polymer can be present as a microgel dispersion, consisting of submicron particles of polymer swollen with water, suspended in the alcohol-rich medium. Such a dispersion, when applied to the membrane, will spread and wet out the surface, while the liquid phase wicks into the pores, leaving the microgel particles behind as a layer on the surface. As the film is allowed to dry by evaporation, the more volatile (poor) solvent leaves first, thereby enriching the remaining liquid in good solvent (water). The microgel particles on the surface then go into solution, forming a continuous film much too viscous to enter the pores, prior to the final complete drying.

Thus, in some especially preferred embodiments of the present invention, the prepolymers (1) are water-soluble, or more preferably, insoluble but swollen in water, (2) also insoluble in a water-miscible organic solvent, but (3) soluble in a limited range of mixtures of these two solvents. It is additionally preferred that the water-miscible organic solvent be more volatile than water.

In preferred embodiments, the prepolymer solution is applied to a sheet or hollow fiber microporous membrane. Suitable sheet or hollow fiber microporous hydrophobic membranes include those known to be suitable for osmotic distillation processes, such as, for example, Celgard (Hoechst Celanese Separation Products Division); Accurel© microporous polypropylene (AKZO NV); and Gore Tex© (Gore Corporation), and PVDF membrane (Millipore Corporataion). Additional hydrophobic microporous membranes suitable for use in the present invention will be readily apparent to those of skill in the art.

Application of the prepolymer solution to the microporous hydrophobic membrane can be accomplished by any of the conventional methods known in the art, such as for example, dip-coating, roll-coating, or spray-coating.

After application of the prepolymer solution to the hydrophobic microporous membrane, the organic solvent is removed from the coated membrane surface by rapid evaporation. It will be understood that complete removal of the solvent is not necessary; some trace may remain. It is only necessary that sufficient solvent be removed to cause deposition of the prepolymer on the membrane surface.

It is greatly desirable to evaporate the solvent at a rate that is sufficient to ensure that the viscosity of the remaining prepolymer will be too high to permit wicking of the prepolymer into the pores of the substrate. The possibility of such wicking is overcome to a great extent by selecting, in accordance with preferred embodiment of the invention, a prepolymer having a hydrodynamic diameter larger than the pores of the hydrophobic membrane, or a solvent system in which the polymer is present as submicron-sized colloidal particles.

In some preferred embodiments, the laminates of the invention contain more than one hydrogel layer. Accordingly, in some preferred embodiments the solvent is evaporated from the coated membrane prior to application of a further prepolymer solution.

In some preferred embodiments of the invention, no crosslinking step is required to stabilize the hydrogel layer. However, for applications where high flow rates across the membrane surface are expected, or where the hydrogel layer is expected to encounter stress, it is preferred that the hydrogel layer be crosslinked to ensure the mechanical stability of the hydrogel.

Thus, in some preferred embodiments of the present invention, after removal of the solvent by evaporation, the dried prepolymer is crosslinked and insolubilized (i.e., "cured"). In accordance with preferred embodiments of the invention utilizing Hypol prepolymer films, crosslinking can be accomplished by contacting the polymer with warm aqueous solution, for example by spraying the prepolymer with warm water (containing, if desired, a low concentration of alkali such as sodium hydroxide to accelerate the crosslinking process) or by exposure to steam, or moist air. It is preferred that crosslinking be performed immediately after the drying of the prepolymer.

After crosslinking, the resulting laminate is dried, for example in warm air, to remove residual moisture prior to storage. In accordance with preferred embodiments of the invention utilizing Hypol-based laminates, where the prepolymer contains a polyglycol, the dry coating retains considerable flexibility and resiliency due to the inherent thermoplasticity of the prepolymer. Thus, there is little danger of damage to the coating during subsequent manipulations. The final laminate, in either sheet or hollow fiber form, is therefore suitable for further processing, such as incorporation into membrane modules by customary fabrication procedures.

In accordance with preferred embodiments of the invention having laminates whose hydrogel layers are formed from cellulosic polymers which embrittle on drying, it is desirable to rinse the hydrogel-containing membrane surface with a dilute solution of glycerin or other nonvolatile, nontoxic humectant prior to drying. This will render the coating plasticized by the humectant and flexible so that it will not crack during the drying process. Such humectant will be rapidly and completely removed during rehydration of the membrane prior to use.

When the (dry) module is installed for use, for example, in an osmotic distillation process, and water or an aqueous feed stream is introduced into the feed compartment, water will rapidly be absorbed by the coating to yield the desired, stable hydrogel layer. Since hydrogels formed from Hypol prepolymers absorb and release their water of hydration reversibly, modules containing laminates with these coatings are capable of being cleaned in a conventional manner, dried if desired, and then restored to the wet condition without danger of deterioration or structural change of the hydrogel layer. For those prepared from cellulosic and most other hydrophilic polymers, humectant treatment prior to final drying is highly desirable.

Hydrogels formed from the preferred prepolymers of the invention are dimensionally and chemically stable, display low adsorptive affinity for proteins and other amphiphilic biopolymers as are present in liquid foodstuffs and biological fluids, and are nontoxic to humans and animals. This renders them eminently suitable candidates for osmotic distillation of liquid solutions of any ingestible solutes, such as foodstuffs, vitamins, drugs, and other biologically important compositions.

In further preferred embodiments of the invention laminates are produced by adsorption from aqueous solution of ultrathin layers of amphiphilic, high-molecular-weight, linear polymers followed by crosslinkage in the adsorbed state with water-soluble reagents.

It is well-known in the art that certain water-soluble, high-molecular-weight, linear polymers exhibiting amphiphilic character are capable of selective, virtually irreversible adsorption onto hydrophobic surfaces from aqueous solution to yield extremely thin, water-wettable films. This property has been utilized to produce stable oil-in-water emulsions and polymer latices, and to treat hydrophobic ultrafiltration membranes to render them non-sorptive for many proteins and other lipophiles which foul these membranes, without reducing their water permeability and changing their permselectivity. Among the most useful polymers for this purpose are water-soluble amphiphilic derivatives of cellulose (most particularly methylcellulose, and hydroxypropylmethyl cellulose, produced by Dow Chemical Company, Midland, Mich., under the trade name Methocel©), and copolymers of vinyl acetate and vinyl alcohol of relatively low acetyl content.

Aqueous solutions of these polymers containing as little as 1.0 g/liter of polymer are suitable for surface treatment of such substrates. The adsorption process is rapid, and will deposit in a layer of the order of 1000–2000 Angstroms (0.1–0.2 micrometer) in thickness. Adsorption is nearly irreversible for polymers of molecular weight of ca. 200,000 or greater. Accordingly, the highest molecular weight polymers available are preferred for the application of the present invention.

Once the adsorption of a complete monolayer has taken place, further adsorption ceases. The adsorbed layer thus protects the pores of the substrate membrane from penetration of polymer. While the adsorbed layer may itself be inadequate to protect the underlying membrane from contamination by feed-components, it provides a polymer-impermeable barrier for application of a polymer coating of suitable thickness. This provides assurance that polymer deposited in this manner will not penetrate the membrane pores.

Thus, when a microporous hydrophobic membrane of the type used in osmotic distillation is exposed to a solution of such a polymer, adsorption will occur substantially uniformly over the entire exposed surface, forming a hydrogel of the order of 1000–2000 Angstroms thick. However, the pores of such membrane are typically in the range of 0.03–0.05 micrometer (300–500 Angstroms) in diameter, which is too small to allow entrance of these macromolecules. Hence, sorption will be confined to the exposed membrane surface, and thus will not alter the wettability of the pore surfaces.

It is preferred that the adsorbed polymer layer be further stabilized against detachment, or changes in degree of hydration with time, to assure consistent performance of the laminate for long periods in service. In some preferred embodiments, cellulose ethers useful in the present invention (as well as the polyvinyl alcohol/acetate copolymers useful in the present invention) contain accessible alcoholic hydroxyl groups which are capable of reacting with certain classes of water-soluble, polyfunctional reagents to generate stable crosslinkages between adjacent polymer chains. Typical reagents of this type include (1) diepoxides such as 1,4 butane diepoxide or diglycidyl glycerine; (2) diisocyanates such as ethylene or tolylene diisocyanate, (3) polyfunctional aldehydes or formaldehyde adducts such as glyoxal, glutaraldehyde, dimethylol urea, or other water-soluble urea/aldehyde adducts, tris (hydroxymethyl) melamine (or other water-soluble melamine/formaldehyde adducts), or (4) dicarboxylic acids such as maleic acid, succinic acid, or phthalic acid. More preferred are the urea/aldehyde and melamine formaldehyde adducts, because of their higher reactivity, reduced toxicity, and higher chemical stability.

Only relatively low levels of crosslinkage (and thus, small amounts of these crosslinking reagents) are required to provide suitable stabilization of the adsorbed films in accordance with the invention. In some prefereed embodiments, crosslinkage is accomplished by contacting a dilute aqueous solution of the reagent (the pH of which has been adjusted to provide maximum rate of reaction with the hydroxyl groups of the adsorbed polymer) with the (wet) membrane after the adsorption step, and allowing sufficient time of contact for adequate reagent uptake and reaction. Because of the thinness of the layer, the reaction time should be rapid, typically from a few seconds to a few minutes after contact. When the reaction is complete, the remaining reagent solution is flushed from the membrane, for example with pure water, in sufficient quantity to insure removal of residual unreacted reagent and soluble byproducts. The washed membrane is then ready for service.

A further preferred class of crosslinking agents for hydroxylated polymers such as cellulose and other polysaccharides and their derivatives is aqueous solutions of zirconium salts of weak acids such as acetic and carbonic. Such products are marketed under the trade name of Bacote® (Magnesium Electron Ltd., Manchester, England). These compounds react with vicinal hydroxyl groups in such polymers to form zirconium chelate complexes that serve as stable crosslinkages between polymer chains. Dilute solutions of these compounds, when contacted with such polymers in the hydrated state at room temperature, react to form crosslinkages in seconds or minutes, converting the polymer to an insoluble but hydratable gel.

The present invention provides several important advantages over current methods for the production of coated membranes. For example, the methods of the invention can be performed on commercially available modules containing microporous hydrophobic membranes. This eliminates all the costly and tedious steps required to produce membrane laminates by multistep treatment of sheet- or hollow-fiber membranes prior to their incorporation into modules. Moreover, the methods of the invention can readily be carried out on "virgin" (i.e., uncoated) modules as received from the supplier, within the facilities of, for example, an osmotic distillation plant, thus advantageously minimizing the likelihood of errors in treatment, or damage to the laminate by mishandling in storage or shipment.

A further significant advantage of the methods of the present invention is that they can be employed to repair (i.e., recoat) microporous membranes which have been rendered unserviceable by failure of the ultra-thin hydrogel layer of the laminate (and not because of failure of the underlying microporous membrane or other module components). Thus, such a laminate can be cleaned (i.e., stripped of residual hydrogel coating) by, for example, flushing of the feed-side of the membrane, or compartment of the membrane module with relatively concentrated (e.g., 1%) warm caustic soda solution will completely depolymerize and solubilize the hydrogel layer, allowing rapid removal of all layer components. Such treatment will have no detrimental effects on the base microporous membrane, nor on other module components. After thorough water rinsing and drying, the module will be restored to its "virgin" (i.e., uncoated) condition. The module is then recoated with a fresh hydrogel layer in accordance with the methods of the invention. Thus, the methods of the invention are useful for substantially increasing the ultimate service-lifetime of membrane modules, and thus significantly reduce the costs associated with osmotic distillation.

In preferred embodiments, sheet membranes, hollow fiber membranes, or woven fabrics containing hollow fiber membranes are coated with the polymer solution by conventional dipping, spraying, roll-coating, or immersion methods, followed by rapid drying by a gas. In some preferred embodiments, the gas is warm, dry air.

Thus, the present invention also provides methods comprising the steps of:

(a) dissolving or dispersing one or more hydrophilic prepolymers in a volatile, low surface tension organic liquid, or in an aqueous mixture of a volatile, low surface tension organic liquid, to produce a coating solution of the prepolymer;

(b) filling the feed-side flow path of a microporous hydrophobic, sheet membrane or hollow fiber membrane module with the coating solution;

(c) flowing warm, dry air or other inert gas through the strip-side of the membrane module to evaporate volatile components while continuing to feed coating solution to the feed-side flow path of the module for a time period sufficient to coat the membrane with the desired thickness of prepolymer;

(d) displacing the majority of the coating solution from the feed-side flow path;

(e) evaporating remaining volatile components from the coated membrane by flowing a gas through both the feed and strip channels of the module;

(f) optionally crosslinking the polymer by contacting the coated surface of the membrane with a solution of a crosslinking agent capable of crosslinking the polymeric coating and rendering it water-insoluble; and (g) drying the coating to remove residual moisture.

In another preferred embodiment, the methods of the invention comprise the procedure above described, modified to allow repetition of steps (b), (c), (d), (e), and (f) with one or more additional polymer solutions or dispersions containing the same or different hydrophilic polymers, in order to form a multilayer coating of the desired composition and thickness.

In these modes of application, the coating thickness can be varied and controlled by, for example, varying the concentration of polymer in the coating solution, and/or the volume of coating solution supplied to the module during the coating and drying process.

After displacement of the majority of the polymer solution in the foregoing methods, the resulting coated membrane or membrane module consists of a dry film hydrophilic polymer bonded to a non-water-wettable microporous substrate.

The resulting membrane coating may, if desired, then be crosslinked as described above. The crosslinking can be accomplished by a variety of means, depending on the chemical reactivity of the polymer and crosslinking reagent, and the optimal conditions for reaction.

In some preferred embodiments crosslinking is accomplished by exposing the coated surface of the laminate to a dilute solution of the crosslinking agent, at a temperature suitable for rapid crosslinking of the polymer. Preferably, the dilute solution of the curing agent is aqueous. Under these conditions, water and dissolved crosslinking agent will diffuse into and swell the coating, with simultaneous crosslinking and insolubilization of the polymer. It is important that the rate of crosslinkage be relatively rapid compared with the rate of dissolution of the uncrosslinked polymer. Typically, rates of chemical reaction increase exponentially with temperature, whereas rates of dissolution of polymers in solvents are much less temperature-dependent. Hence, for each polymer and crosslinking agent, there will be an optimum treatment temperature which will insure adequate crosslinkage without loss of coating by dissolution. It will be appreciated that the determination of such optimum treatment temperature is well within the skill of those in the art, once armed with the present disclosure.

In other preferred embodiments, certain reactive polymer/crosslinker combinations can be comingled in solution without significant chemical reaction occurring for rather long periods of time at low temperatures (or low concentrations), but will rapidly coreact when concentrated and/or exposed to elevated temperature. Such combinations may be incorporated into the coating solution, allowing uniform coating and drying as observed with the polymer component alone. However, during the terminal drying step, elevation of the temperature will permit rapid coreaction and crosslinkage, thereby yielding a water-swellable but water-insoluble hydrogel layer.

In further preferred embodiments, the polymer-crosslinking agent components of the coating solution are selected such that initiation of the reaction can be induced by the presence of a soluble catalyst—typically an acid or a base. In the absence of such catalyst, the combination can be considered to be nonreactive, permitting coating as described above. After the prepolymer coating has been deposited and dried, a solution of the catalyst, which preferably is aqueous, can be passed over the coated surface by flow through the feed channel, to allow the catalyst to diffuse into the (water-swollen) film and promote the crosslinking reaction. In some preferred embodiments, volatile acids or bases (e.g., HCl or $NH_3$) are employed as catalysts. With these reagents, the crosslinking reaction is initiated by passage of the vapors of the volatile acid or base through the flow channels of the module.

In further preferred embodiments prepolymers are employed that do not require addition of separate crosslinking agents.

Additional advantages and novel features of this invention will become apparent to those skilled in the art upon examination of the examples thereof provided below, which should not be construed as limiting the appended claims.

EXAMPLE 1

Hydroxypropylmethyl cellulose (Methocel© J75M-SN, Dow Chemical Company, Midland, Mich.) was dissolved at a concentration of 1% by weight in a solvent mixture of isopropyl alcohol and water in equivolume proportions to form a clear, viscous coating solution. The coating solution was spread on the surface of a Celgard© 2500 membrane with a nominal pore size of about 50 nanometers (i.e., 500 Angstroms). Immediately on application of the coating solution, the white, translucent membrane became semitransparent, indicating liquid penetration into the membrane pores. The membrane was then allowed to dry by solvent evaporation in air at about 40 C, whereupon it recovers its original translucent appearance, indicating the removal of liquid from the membrane pores.

When the uncoated membrane was moistened with vegetable oil (a low surface tension liquid), it nearly instantaneously became transparent due to penetration of the oil into the pore spaces. However, when the coated side of the laminate was moistened with the same oil, there was no change in the translucency of the membrane, indicating that the oil had not penetrated into the substrate pores. However, when the reverse side of the laminate was moistened with the same oil, immediate transparency was observed, confirming that the pore space of the membrane had not been obstructed by the coating polymer.

EXAMPLE 2

A Celgard membrane was coated with Methocel© J75M-SN according to the of Example 1 above. The prepolymer film was crosslinked using Freerez 900 Reactant (sold by Freedom Textile Chemicals Co. located in Charlotte, N.C.), an aqueous solution of a glyoxal-urea adduct which crosslinks hydroxylated polymers like cellulose by forming acetal linkages with vicinal hydroxyls on the polymer. The reaction was accelerated under acidic conditions by Freecat #9 Accelerator (also sold by Freedom Textile Chemicals Co.), which is an aqueous solution of a mixture of magnesium and aluminum chlorides (about 25% solids—pH 1.0).

A dilute solution of the reactant concentrate was prepared by mixing 1 part by volume of concentrate with 3 parts cool distilled water (this solution is shelf stable). Immediately prior to use, approximately 2 ml of the Freecat concentrate was added to 100 ml of the diluted Freerez solution at room temperature, and the resultant solution was mixed well.

A section of dry, Methocel-coated membrane (coating side up; prepared according to the procedure of Example 1) was taped to a glass plate, using waterproof pressure sensitive tape around all edges. Care was exercised to ensure that no liquid could leak under the membrane.

The plate was placed in a shallow glass pan, and sufficient catalyst solution was poured into the pan to cover the coated surface to a depth of about ⅛th of an inch. The pan was covered with either plastic wrap or a plate to prevent evaporation, and placed either on a hot plate set at 50 C, or in a laboratory oven set at the same temperature. After about 1–2 hours the plate was removed from the heat, and allowed to cool and stand (covered) at room temperature overnight.

The plate carrying the membrane was removed from the pan, and washed thoroughly but gently in running tap water for 5–10 minutes. The plate and membrane were then stored vertically and allow to dry in air at room temperature.

When the membrane was dried, the plate was placed membrane up on a dark surface. Using a small glass rod, 3 or 4 small drops of olive oil (light mineral or vegetable are also suitable) were placed on the coated surface to check the coating. The coating under the oil drops remained translucent like the adjacent area for an hour at least, indicating that the coating was intact and void-free. (Had it rapidly became transparent, it would have indicated that the coating was defective.

To confirm that the crosslinking procedure had not damaged the coating, the same oil-test was performed with a sample of the uncrosslinked Methocel-coated membrane. Had the membrane absorbed the oil, this would have indicated that the initial coating process was inadequate. Had it showed no oil uptake, while the crosslinked coating had done so, it would have indicated that the crosslinking treatment had damaged the coating.

The plate and membrane was submerged in a pan filled with deionized water, and allowed to soak for 12–24 hours at room temperature. The same procedure was performed with an uncrosslinked Methocel-coated membrane.

The plate and membrane were removed from the water, allowed to drain free of liquid, and then allowed to dry in the vertical position at room temperature for 15–20 minutes.

The oil-drop test was repeated as described above. A lack of oil uptake indicated that the coating was adequately crosslinked. Had oil been imbibed (but not prior to the long water-soaking), it would have indicated that the coating was inadequately crosslinked.

EXAMPLE 3

A Celgard membrane was coated with Methocel according to the of Example 1 above. The prepolymer film was crosslinked using Bacote 20 (sold by Magnesium Electron Ltd. located in Manchester, England), an aqueous solution of ammonium zirconyl carbonate (pH about 9). This compound reacts with the hydroxyl groups of cellulose and other hydroxylated polymers to form a hydroxylated zirconium coordination complex which functions as a stable crosslink. The ammonia and carbon dioxide are eliminated as gases on drying.

A 5% solution of the Bacote reagent was prepared by diluting 1 part of the concentrate with 9 parts chilled, distilled or deionized water. This working solution can be stored in the refrigerator (4–10 C) for several weeks without deterioration.

A plate-mounted, Methocel-coated membrane sample was prepared as described in Example 2 above. The same pan-immersion procedure described above was used for contacting the coated surface with the reagent solution.

The pan and contents were warmed to 40 C on a hot plate or in an oven, held for about 30 minutes at that temperature, then allow to cool to room temperature and stand in contact with the solution for 3–4 hours (or overnight). The remaining procedure was identical to that described in Example 2.

The coatings prepared and crosslinked by the procedures of Examples 2 and 3 both remained water-insoluble and intact. Surprisingly, the uncrosslinked Methocel membranes also appeared to be water-insoluble and intact. Accordingly, in some preferred embodiments, membranes of the present invention can be prepared by the methods described herein, but without need for a crosslinking step.

EXAMPLE 4

A polymer solution is prepared as described in the previous examples, by adding the Methocel powder to isopropyl alcohol to produce a suspension (the gum being insoluble in the alcohol), and then slowly adding water to the suspension until the solution becomes quite viscous and nearly transparent. The resulting solution appears to be a true solution of the polymer.

When a small amount of additional isopropyl alcohol is added slowly to this solution, the viscosity rapidly drops, and the solution becomes opalescent. This indicates that the dissolved polymer solution has been converted to a colloidal dispersion because of partial polymer/solvent incompatibility. This solution is then used to coat membranes as described in Examples 1–4. The coatings obtained with this solution are at least as good as those obtained with the clear, viscous solution, and possibly even somewhat better. Additionally, this less viscous solution is advantageous in that it is a easier to apply, and seems to dry more rapidly.

EXAMPLE 5

The procedure of Examples 1–4 are repeated using acetone as the organic liquid, or an aqueous mixture thereof.

It is intended that each of the patents, applications, and printed publications mentioned or referred to in this specification be herein incorporated by reference in their entirety.

As those skilled in the art will appreciate, numerous changes and modifications may be made to the preferred embodiments of the invention without departing from the spirit of the invention. It is intended that all such variations fall within the scope of the invention.

What is claimed is:

1. A method for producing a laminate, the laminate comprising a hydrogel layer bound to a microporous hydrophobic membrane, comprising:
    (a) dissolving or dispersing one or more hydrophilic prepolymers in a volatile, low surface tension organic liquid, or in an aqueous mixture of a volatile, low surface tension organic liquid, to produce a coating solution of the prepolymer, the coating solution having a viscosity of from about 100 to about 1000 centipoise;
    (b) applying the coating solution to one surface of a microporous hydrophobic membrane sheet, or to the external surface of a microporous, hydrophobic hollow fiber membrane to form a coating on the surface;
    (c) evaporating the volatile components from the coating;
    (d) contacting the coated surface with a solution of a crosslinking agent to crosslink the coated surface and thereby render the coating water-insoluble;
    (e) optionally water-washing the crosslinked polymer to remove water soluble components therefrom; and
    (f) drying the coating to remove residual moisture, to produce the laminate.

2. The method of claim 1 further comprising repeating steps (a)–(e).

3. The method of claim 1 wherein the prepolymer has a molecular weight sufficiently high to prevent entry of the prepolymer into the pores of the microporous membrane, or is dispersed in aggregates that are larger than the pores of the membrane.

4. The method of claim 2 wherein the prepolymer in the first step (b) has a molecular weight sufficiently high to prevent entry of the prepolymer into the pores of the microporous membrane or is dispersed in aggregates that are larger than the pores of the membrane.

5. The method of claim 1 wherein the prepolymer is a cellulose ether or ester, polyvinyl alcohol, polyvinyl alcohol copolymer with vinyl acetate, N-alkyl polyacrylamide, N-alkyl polyacrylamide copolymer with acrylamide, a polyethylene-glycol-based, isocyanate-capped polyurethane, an esterified or etherated polysaccharide, a hydroxyalkylated polyacrylate, a polymethacrylate, or a hydroxyalkylated polymethacrylate.

6. The method of claim 1 wherein the prepolymer is a linear or branched, polyethylene-glycol-based isocyanate capped polyurethane, methylcellulose, hydroxypropylcellulose, hydroxypropylmethyl cellulose, polyvinyl alcohol, or a copolymer of vinyl acetate and vinyl alcohol.

7. The method of claim 1 wherein the volatile low surface tension organic liquid is a water-soluble lower aliphatic alcohol, a water-soluble lower aliphatic ketone, a water-soluble lower aliphatic ether, acetonitrile, N-methyl pyrrolidinone, methyl cellosolve, mixtures thereof, or aqueous solutions thereof.

8. The method of claim 1 wherein the volatile low surface tension organic liquid is methyl alcohol, ethyl alcohol, n-propyl alcohol, isopropyl alcohol, acetone, methyl ethyl ketone, tetrahydrofuran, dioxane, dimethylformamide, N-methyl pyrrolidinone, mixtures thereof, or aqueous solutions thereof.

9. The method of claim 8 wherein the volatile low surface tension organic liquid is acetone, isopropyl alcohol, or an aqueous mixture thereof.

10. The method of claim 1 wherein said microporous membrane is a polyvinylidene fluoride, polytetrafluoroethylene, polysulfone, polyethylene, or polypropylene membrane.

11. A method comprising the steps of:
    (a) dissolving or dispersing one or more hydrophilic prepolymers in a volatile, low surface tension organic liquid, or in an aqueous mixture of a volatile, low surface tension organic liquid, to produce a coating solution of the prepolymer, said coating solution having a viscosity of from about 100 to about 1000 centipoise;
    (b) providing a microporous hydrophobic, sheet membrane or hollow fiber membrane module having a feed-side flow path and a strip-side flow path, and filling the feed-side flow path of the microporous hydrophobic, sheet membrane or hollow fiber membrane module with the coating solution;
    (c) flowing warm, dry air or other inert gas through the strip-side flow path of the membrane module to evaporate volatile components while continuing to feed coating solution to the feed-side flow path of the module for a time period sufficient to coat the membrane with a preselected thickness of prepolymer to form a coated membrane;
    (d) displacing the coating solution from the feed-side flow path;
    (e) evaporating remaining volatile components from the coated membrane by flowing a gas through both the feed and strip flow paths of the module;
    (f) optionally contacting the polymeric coating with a solution of a crosslinking agent to crosslink the coating of the membrane and thereby render the coating water-insoluble; and
    (g) drying the coating to remove residual moisture.

12. The method of claim 11 further comprising repeating steps (a)–(f).

13. The method of claim 11 wherein the prepolymer has a molecular weight sufficiently high to prevent entry of the prepolymer into the pores of the microporous membrane, or is dispersed in aggregates that are larger than the pores of the membrane.

14. The method of claim 11 wherein the prepolymer in the first step (b) has a molecular weight sufficiently high to prevent entry of the prepolymer into the pores of the microporous membrane, or is dispersed in aggregates that are larger than the pores of the membrane.

15. The method of claim 11 wherein the prepolymer is a cellulose ether or ester, polyvinyl alcohol, polyvinyl alcohol copolymer with vinyl acetate, N-alkyl polyacrylamide, N-alkyl polyacrylamide copolymer with acrylamide, an isocyanate-capped, polyethylene-glycol-based polyurethane, an esterified or etherated polysaccharide, a hydroxyalkylated polyacrylate, a polymethacrylate, or a hydroxylated polymethacrylate.

16. The method of claim 15 wherein the prepolymer is a linear or branched polyethylene-glycol-based isocyanate capped polyurethane, cellulose, methylcellulose, hydroxypropylcellulose, hydroxypropylmethyl cellulose, or copolymers of vinyl acetate and vinyl alcohol.

17. The method of claim 12 wherein the volatile low surface tension organic liquid is a water-soluble lower aliphatic alcohol, a water-soluble lower aliphatic ketone, a water-soluble lower aliphatic ether, acetonitrile, N-methyl pyrrolidinone, methyl cellosolve, mixtures thereof, or aqueous solutions thereof.

18. The method of claim 17 wherein the volatile low surface tension organic liquid is methyl alcohol, ethyl alcohol, n-propyl alcohol, isopropyl alcohol, acetone, methyl ethylketone, tetrahydrofuran, dioxane, dimethyl formamide, N-methyl pyrrolidinone, mixtures thereof, or aqueous solutions thereof.

19. The method of claim 18 wherein the volatile low surface tension organic liquid is acetone, isopropyl alcohol, or an aqueous mixture thereof.

20. The method of claim 11 wherein the microporous membrane is a polyvinylidene fluoride, polytetrafluoroethylene, polysulfone, polyethylene, or polypropylene membrane.

21. The method of claim 11 wherein the microporous hydrophobic sheet membrane or hollow fiber membrane module is provided by cleaning a sheet-microporous membrane or a membrane laminate module which has a damaged hydrogel layer.

22. A method for producing a laminate, the laminate comprising a hydrogel layer bound to a microporous hydrophobic membrane, comprising:
(a) dissolving one or more cellulose polymers selected from the group consisting of methyl cellulose, hydroxypropyl cellulose and hydroxypropylmethyl cellulose in a volatile, low surface tension organic liquid, or an aqueous mixture of a volatile, low surface tension organic liquid, to produce a coating solution, the cellulose polymer having high methoxyl content, and/or high ratio of methyl to hydroxypropyl substitution;
(a) applying the coating solution to one surface of a sheet or hollow fiber microporous hydrophobic membrane;
(c) evaporating volatile components from the coating;
(d) optionally washing the membrane; and
(e) drying the polymer to remove residual moisture to produce the laminate.

23. The method of claim 22 wherein the prepolymer has a molecular weight sufficiently high to prevent entry of the prepolymer into the pores of the microporous membrane.

24. The method of claim 23 wherein the prepolymer is a hydroxypropylmethyl cellulose.

25. The method of claim 22 wherein the volatile low surface tension organic liquid is a water-soluble lower aliphatic alcohol, a water-soluble lower aliphatic ketone, a water-soluble lower aliphatic ether, acetonitrile, N-methyl pyrrolidinone, methyl cellosolve, mixtures thereof, or aqueous solutions thereof.

26. The method of claim 25 wherein the volatile low surface tension organic liquid is methyl alcohol, ethyl alcohol, n-propyl alcohol, isopropyl alcohol, acetone, methyl ethylketone, tetrahydrofuran, dioxane, dimethyl formamide, N-methyl pyrrolidinone, mixtures thereof, or aqueous solutions thereof.

27. The method of claim 26 wherein the volatile low surface tension organic liquid is acetone, isopropyl alcohol, or an aqueous mixture thereof.

28. The method of claim 22 wherein the microporous membrane is a polyvinylidene fluoride, polytetrafluoroethylene, polysulfone, polyethylene, or polypropylene membrane.

29. A method comprising the steps of:
(a) dissolving or dispersing one or more hydrophilic prepolymers in a volatile, low surface tension organic liquid, or in an aqueous mixture of a volatile, low surface tension organic liquid, to produce a coating solution of the prepolymer, said coating solution having a viscosity of from about 100 to about 1000 centipoise;
(b) feeding the coating solution to the feed-side flow channel of a sheet- or hollow-fiber-microporous hydrophobic membrane module in sufficient quantity and at a sufficient rate to form a polymer coating on the membrane surface of a preselected thickness, while simultaneously passing an inert gas to the strip-side of the module to evaporate volatile components;
(c) evaporating residual volatile components from the polymer coating on the membrane surface by flowing a gas through both the feed and strip channels of the coated module;
(d) optionally contacting the polymer coating on the surface of the membrane with a solution of a crosslinking agent capable of crosslinking the polymeric coating to crosslink the polymeric coating and thereby render the polymeric coating water-insoluble; and
(e) drying the coating to remove residual moisture.

30. The method of claim 29 further comprising repeating steps (a)–(d).

31. The method of claim 29 wherein the prepolymer has a molecular weight sufficiently high to prevent entry of the prepolymer into the pores of the microporous membrane, or is dispersed in aggregates that are larger than the pores of the membrane.

32. The method of claim 29 wherein the prepolymer in the first step (b) has a molecular weight sufficiently high to prevent entry of the prepolymer into the pores of the microporous membrane, or is dispersed in aggregates that are larger than the pores of the membrane.

33. The method of claim 29 wherein the prepolymer is a cellulose ether or ester, polyvinyl alcohol, polyvinyl alcohol copolymer with vinyl acetate, N-alkyl polyacrylamide, N-alkyl polyacrylamide copolymer with acrylamide, an isocyanate-capped, polyethylene-glycol-based polyurethane, an esterified or etherated polysaccharide, a hydroxyalkylated polyacrylate, a polymethacrylate or a hydroxyalkylated polymethacrylate.

34. The method of claim 33 wherein the prepolymer is a linear or branched polyethylene-glycol-based isocyanate capped polyurethane, methylcellulose, hydroxypropylcellulose, hydroxypropylmethyl cellulose, or copolymers of vinyl acetate and vinyl alcohol.

35. The method of claim 29 wherein the volatile low surface tension organic liquid is a water-soluble lower aliphatic alcohol, a water-soluble lower aliphatic ketone, a water-soluble lower aliphatic ether, acetonitrile, N-methyl pyrrolidinone, methyl cellosolve, mixtures thereof, or aqueous solutions thereof.

36. The method of claim 35 wherein the volatile low surface tension organic liquid is methyl alcohol, ethyl alcohol, n-propyl alcohol, isopropyl alcohol, acetone, methyl ethylketone, tetrahydrofuran, dioxane, dimethyl formamide, N-methyl pyrrolidinone, mixtures thereof, or aqueous solutions thereof.

37. The method of claim 36 wherein the volatile low surface tension organic liquid is acetone, isopropyl alcohol, or an aqueous mixture thereof.

38. The method of claim 29 wherein said microporous membrane is a polyvinylidene fluoride, polytetrafluoroethylene, polysulfone, polyethylene, or polypropylene membrane.

39. The method of claim 29 wherein the sheet-microporous membrane or a membrane laminate module is provided by cleaning a sheet-microporous membrane laminate or a membrane laminate module that has a damaged hydrogel layer.

40. A method for producing a laminate, the laminate comprising a hydrogel layer bound to a microporous hydrophobic membrane, comprising the steps of:
  (a) dissolving or dispersing one or more hydrophilic prepolymers in a volatile, low surface tension organic liquid, or in an aqueous mixture of a volatile, low surface tension organic liquid, to produce a coating solution of the prepolymer, said coating solution having a viscosity of from about 100 to about 1000 centipoise;
  (b) applying the coating solution to one surface of a sheet- or hollow fiber microporous hydrophobic membrane, or to the surface of a woven fabric containing microporous, hydrophobic hollow-fiber membranes to form a polymeric coating thereon;
  (c) evaporating the volatile low surface tension organic liquid from the coating;
  (d) optionally contacting the polymer coating on the surface of the membrane with a solution of a crosslinking agent capable of crosslinking the polymeric coating to crosslink the polymeric coating and thereby render the polymeric coating water-insoluble; and
  (e) drying the polymer to remove residual moisture.

41. The method of claim 40 further comprising repeating steps (a)–(d).

42. The method of claim 40 wherein the prepolymer has a molecular weight sufficiently high to prevent entry of the prepolymer into the pores of the microporous membrane, or is dispersed in aggregates that are larger than the pores of the membrane.

43. The method of claim 40 wherein the prepolymer in the first step (b) has a molecular weight sufficiently high to prevent entry of the prepolymer into the pores of the microporous membrane, or is dispersed in aggregates that are larger than the pores of the membrane.

44. The method of claim 40 wherein the prepolymer is a cellulose ether or ester, polyvinyl alcohol, polyvinyl alcohol copolymer with vinyl acetate, N-alkyl polyacrylamide, N-alkyl polyacrylamide copolymer with acrylamide, an isocyanate-capped, polyethylene-glycol-based polyurethane, an esterified or etherated polysaccharide, a hydroxyalkylated polyacrylate, a polymethacrylate or a hydroxyalkylated polymethacrylate.

45. The method of claim 44 wherein the prepolymer is a linear or branched polyethylene-glycol-based isocyanate capped polyurethane, cellulose, methylcellulose, hydroxyproplycellulose hydroxypropylmethyl cellulose, or copolymers of vinyl acetate and vinyl alcohol.

46. The method of claim 40 wherein the volatile low surface tension organic liquid is a water-soluble lower aliphatic alcohol, a water-soluble lower aliphatic ketone, a water-soluble lower aliphatic ether, acetonitrile, N-methyl pyrrolidinone, methyl cellosolve, mixtures thereof, or aqueous solutions thereof.

47. The method of claim 46 wherein the volatile low surface tension organic liquid is methyl alcohol, ethyl alcohol, n-propyl alcohol, isopropyl alcohol, acetone, methyl ethylketone, tetrahydrofuran, dioxane, dimethyl formamide, N-methyl pyrrolidinone, mixtures thereof, or aqueous solutions thereof.

48. The method of claim 47 wherein the volatile low surface tension organic liquid is acetone, isopropyl alcohol, or an aqueous mixture thereof.

49. The method of claim 40 wherein said microporous membrane is a polyvinylidene fluoride, polytetrafluoroethylene, polysulfone, polyethylene, or polypropylene membrane.

50. The method of claim 40 wherein the sheet-microporous membrane or a membrane laminate module is obtained by cleaning a sheet-microporous membrane laminate or a membrane laminate module that has a damaged hydrogel layer.

51. The laminate produced by the method of claim 1.
52. The laminate produced by the method of claim 4.
53. The laminate produced by the method of claim 11.
54. The laminate produced by the method of claim 29.
55. The laminate produced by the method of claim 40.

* * * * *

UNITED STATES PATENT AND TRADEMARK OFFICE
CERTIFICATE OF CORRECTION

PATENT NO.   : 6,112,908
DATED        : September 5, 2000
INVENTOR(S)  : Michaels It is certified that error appears in the above-identified patent and that said Letters Patent is hereby corrected as shown below:

Title page,
Column 2, under: References Cited
U.S. PATENT DOCUMENTS
Please delete "4,787,837     11/1988     Lefebvre" and insert
therefore     -- 4,781,837    11/1988     Lefebvre --.

Column 18,
Line 23, please delete "prefereed" and insert therefor -- preferred --.

Signed and Sealed this

Fourteenth Day of August, 2001

*Attest:*

*Attesting Officer*

NICHOLAS P. GODICI
*Acting Director of the United States Patent and Trademark Office*